United States Patent [19]

Iorio et al.

[11] Patent Number: 5,241,991
[45] Date of Patent: Sep. 7, 1993

[54] ELECTRO-RHEOLOGICAL CONTROL VALVE

[75] Inventors: Vincent M. Iorio, Annapolis; Joseph H. Morris, Queenstown, both of Md.

[73] Assignee: The United States of America as represented by the Secretary of the Navy, Washington, D.C.

[21] Appl. No.: 947,591

[22] Filed: Sep. 21, 1992

[51] Int. Cl.$^5$ ............................................. G05D 7/06
[52] U.S. Cl. ............................ 137/807; 137/251.1; 137/625.32; 137/827; 137/829; 137/909; 251/129.01; 251/118; 251/122
[58] Field of Search ............... 137/13, 251.1, 625.32, 137/807, 827, 829, 831, 909; 251/129.01, 118, 122

[56] References Cited

U.S. PATENT DOCUMENTS

| | | | |
|---|---|---|---|
| 2,869,818 | 1/1959 | Fleuret | 137/251.1 X |
| 3,010,471 | 11/1961 | Gross | 137/251.1 |
| 3,103,336 | 9/1963 | Danforth . | |
| 3,405,728 | 10/1968 | Dexter . | |
| 3,416,549 | 12/1968 | Chaney et al. . | |
| 3,587,613 | 7/1971 | Mark . | |
| 4,147,326 | 4/1979 | Natalizia . | |
| 4,540,025 | 9/1985 | Ledeen et al. | 137/625.32 |
| 4,610,424 | 9/1986 | Koppers . | |
| 4,658,978 | 4/1987 | Ikematsu . | |
| 5,158,109 | 10/1992 | Hare | 137/909 X |

FOREIGN PATENT DOCUMENTS

| | | | |
|---|---|---|---|
| 723743 | 3/1980 | U.S.S.R. | 137/807 |
| 772310 | 1/1982 | U.S.S.R. | 251/129.01 |

OTHER PUBLICATIONS

Cyanamid "Electro-Rheological Fluids" American Cyanamid Company NBD-001-86-2507-4.5 M (undated).
Duclos et al. "Machine Design" Jan. 21, 1988, pp. 42, 43, 44, 46.
J. E. Stangroom "Phys, Technol.", vol. 14, 1983 pp. 290-296.

Primary Examiner—Gerald A. Michalsky
Attorney, Agent, or Firm—Gary G. Borda; Charles D. Miller

[57] ABSTRACT

An E-R hydraulic control valve that has two or more surfaces that can be moved relatively to one another to adjust a flow orifice size while maintaining a control voltage gradient across the E-R fluid and to seat one surface against the other to shut off fluid flow. Combining movable mechanical fluid flow elements with E-R fluid control allows initial tuning of the valve to a particular application by mechanical restriction of an orifice, and E-R operating control of the fluid. Seating the mechanical surfaces provides a fail-safe shut-down mode.

4 Claims, 2 Drawing Sheets

ELECTRO-RHEOLOGICAL CONTROL VALVE

BACKGROUND OF THE INVENTION

1. Field of the Invention

This invention relates to electro-rheological hydraulic control valves, and more particularly to an improved valve that has a reduce power consumption, enhance performance, and provides fail-safe shut-off in normal mode and failure mode operation.

2. Description of the Prior Art

As will be appreciated by those skilled in the art, electro-rheological fluids are slurries typically comprised of a non-conducting fluid and particulates. A typical slurry contains about 30% particulates and about 6% water by weight, mixed in a dielectric liquid. The application of a high-voltage electric field across a small gap filled with a electro-rheological fluid causes the water absorbed in the particulate to form induced dipoles which align the particles between the electrodes, resulting in an effective change in viscosity in the localized area between the electrodes. The particulates are normally on the order of 10 to 50 microns in diameter, and may be either hard or soft. Electro-rheological materials and some applications are discussed in more detail in the literature, including the following articles, which are incorporated herein by reference.

*Cyanamid*, "Electro-Rheological Fluids", American Cyanamid Company, Wayne, N.J.

*Machine Design*, "Fluids That Thicken Electrically", by Theodore G. Duclos, Debra N. Acker and J. David Carlson, Thomas Lord Research Center, Lord Corporation, Cary, N.C.; Jan. 21, 1988.

*Phys. Technology*, Vol. 14, 1983, The Institute of Physics, "Electrorheological Fluids" by J. E. Stangroom.

One of the advantages of using electro-rheological (E-R) fluids is that their use allows direct flow control of the fluid by an electrical circuit. This eliminates the need for intermediate control steps that normally increase the response time of a system.

In prior art E-R valves, the complete shut-off of fluid flow is accomplished by increasing the voltage gradient across the fluid to a value where the shearing resistance of the fluid precludes fluid flow. However, this prior art shut-off method requires the application of continuous power to the valve in a shut-off mode. This is disadvantageous in terms of energy efficiency, and may damage the E-R fluid in the valve due to resistance heating. Further, in the event of an electrical failure, such valves lack a fail-safe operation for shut off.

SUMMARY OF THE INVENTION

An object of this invention is the provision of an E-R hydraulic control valve that is efficient in terms of power consumption and has a fail-safe shut down operation in case of a power failure to the valve.

A more specific object of the invention is the provision of an E-R hydraulic control valve that does not require the application of power to the E-R fluid shut-off operating mode.

Briefly, this invention contemplates the provision of an E-R hydraulic control valve that has two or more surfaces that can be moved relatively to one another to adjust a flow orifice size while maintaining a control voltage gradient across the E-R fluid and to seat one surface against the other to shut off fluid flow. Combining movable mechanical fluid flow elements with E-R fluid control allows initial tuning of the valve to a particular application by mechanical restriction of an orifice, and E-R operating control of the fluid. Seating the mechanical surfaces provides a fail-safe shut-down mode.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
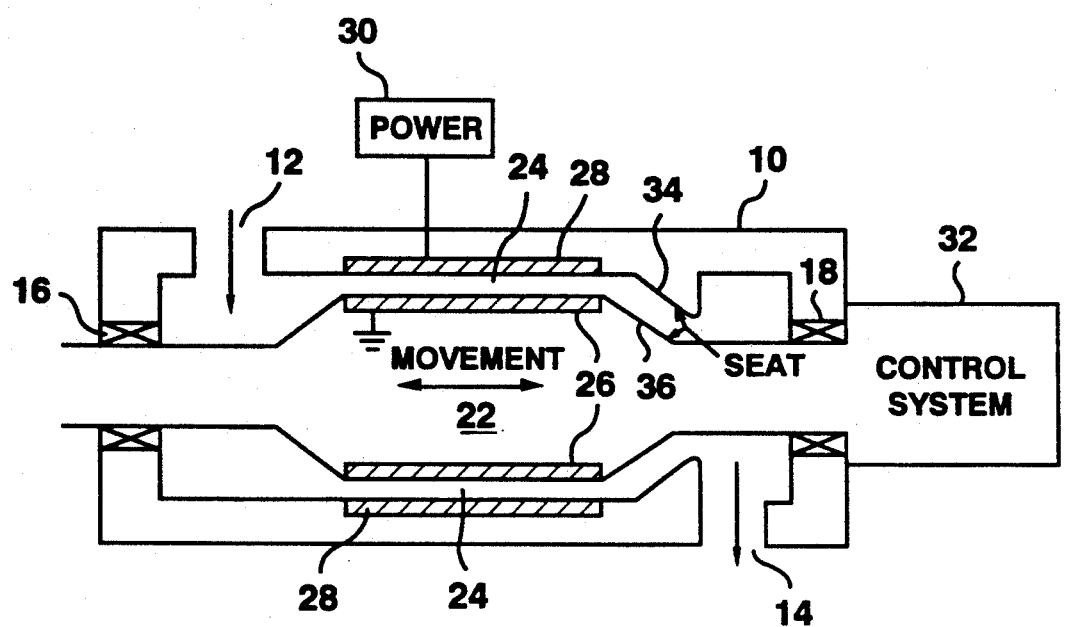
FIG. 1 is a schematic drawing of a cylindrical valve in accordance with the teaching of this invention.

Referring now to FIG. 1, it illustrates, schematically one embodiment of an E-R hydraulic control valve in accordance with the teachings of this invention. This valve has a cylindrical geometry including a cylindrical housing 10 with an E-R fluid inlet port 12 and an R-H fluid outlet port 14. A pair of bearings 16 and 18 in the housing 10 support a cylindrical valve member 22 in the flow path between the inlet port 12 and the outlet port 14. There is a narrow cylindrical gap 24 between the valve member 22 and the inner wall of the housing 10. A conductive strip 26 is disposed about the circumference of the valve member 22 in the region of the gap 24 and a conductive strip 28 is disposed about the inner circumference of the housing 10 opposite the strip 26. The gap 24 is typically on the order of $\frac{1}{4}$ mm to 1 cm wide.

A controllable power supply 30 is connected to conductive strip 28 and conductive strip 26 is connected to a ground so that an electric potential can be established across the gap defined by strips 26 and 28. The flow of E-R fluid between inlet port 12 and outlet port 14 can be controlled by controlling the voltage across the gap, which in turn varies the viscosity of the fluid.

The bearings 16 and 18 support the valve member so that it can move back and forth relative to the housing as indicated by the arrow in the drawing. A control system 32 controls this back-and-forth movement; any of a number of prior art control systems are suitable to perform the function of control system 32, such as for example, torque motors, hydraulic and pneumatic rams, springs and the like.

The housing 10 has a circular lip 34 against which a circular tapered portion 36 of the valve member 22 seats when the valve moves in the direction of the lip. The regions where the housing and the valve member contact are electrically isolated from the circumferential conductive strips 26 and 28 so that the power supply 30 is not shorted when the valve is mechanically closed. Preferably, these portions of the valve are made of or coated with a suitable dielectric material. When taper 36 contacts lip 34, flow is cut-off. Valve member may be mechanically biased to move to this position in the event of a power failure in control system 32. Further, such a mechanical bias allows E-R fluid flow cut-off without requiring a voltage across gap 24.

Figure 2:
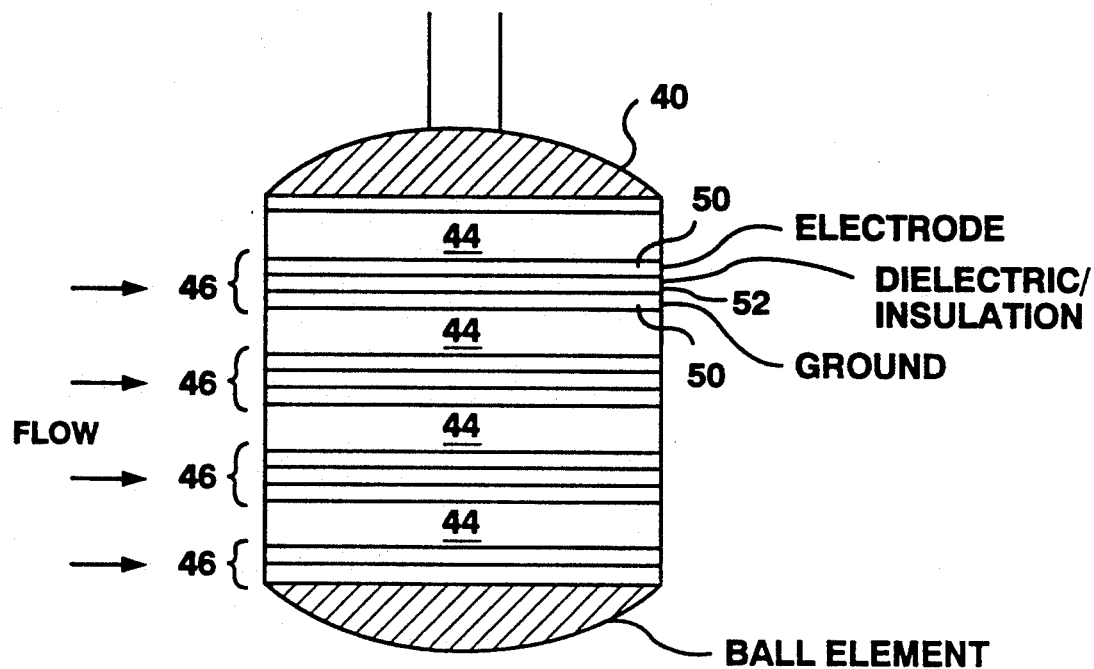
FIG. 2 is a side view of a ball valve in accordance with the teaching of this invention.
Figure 3:
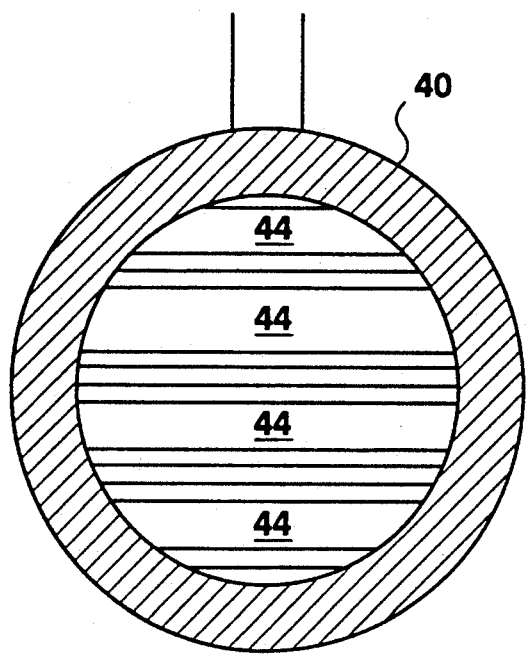
FIG. 3 is a front view of a ball valve in accordance with the teachings of this invention.

FIGS. 2 and 3 illustrate how the teachings of this invention applied to an otherwise conventional ball valve where a ball rotates in a housing relative to inlet and outlet ports, providing a flow path through the ball in on position and blocking the flow path when rotated 90°.

Here, a ball valve member has a series of parallel plates 46 that extend the length of the passage through the ball. E-R fluid flows in the gaps 44 between the plates 46 and the flow can be controlled by controlling the voltage gradient between plates on either side of each gap.

Each of the plates 46 comprises an upper and lower conducting layer 50 on its outer surfaces, separated by a dielectric layer 52. One of the conducting layers 50 (e.g., the top layer as view in FIG. 2) is connected to a source of electrical potential (not shown) and the other layer (e.g., the bottom layer) of each plate is connected to ground or other suitable potential source so that a potential gradient is established between adjacent plates 46. Adjusting the potential between the plates controls the flow of E-R fluid through the orifice. Further, as in a conventional ball valve, rotation of the ball restricts the flow of fluid and its closed position stops the flow completely.

Figure 4:
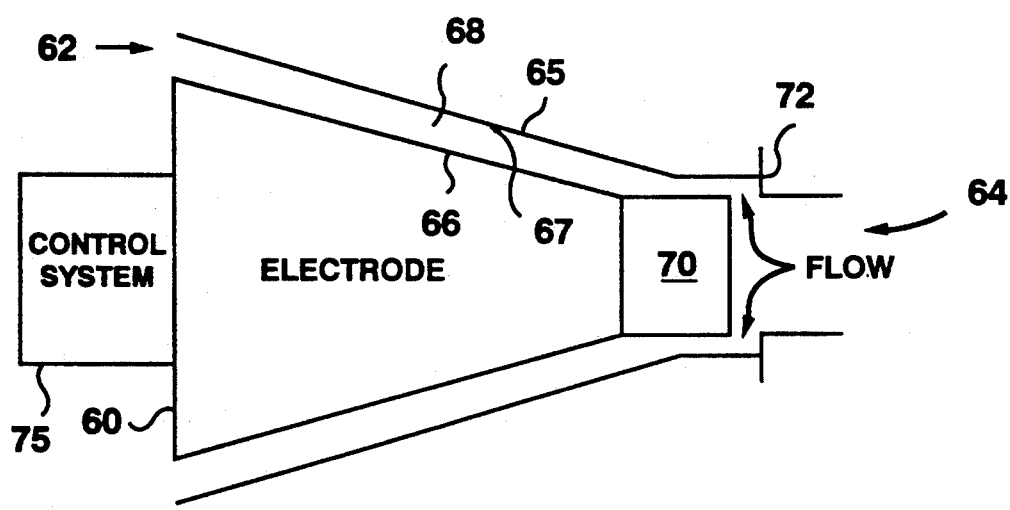
FIG. 4 is a schematic drawing of a tapered plug valve in accordance with the teaching of this invention.

Referring now to FIG. 4, it shows an E-R tapered-plug, control valve with a mechanical fail-safe shut-off in accordance with the teachings of this invention. Here, a tapered plug 60, in a flow path that extends from opening 62 to opening 64 in a housing 65, has a conductive outer surface 66 along its tapered surface. The plug is spaced slightly from a tapered conducting inner wall 67 of the housing forming a gap 68. A potential gradient is established in the gap 68 between the conductive surfaces 66 and 67 by means of a power supply (not shown). Controlling the potential gradient across this gap controls E-R fluid flow through the flow path in housing 65 between openings 62 and 64.

A nonconducting member 70 at the end of the plug 60 is designed so that it engages a valve seat 72 when the plug 60 is urged to the right in FIG. 4 by a suitable control system indicated schematically at 75. In this position, the flow is mechanically shut off, providing a fail-safe operation, and a shut-off operation that does not require continued power to be applied across gap 68.

While the invention has been described in terms of a single preferred embodiment, those skilled in the art will recognize that the invention can be practiced with modification within the spirit and scope of the appended claims.

Having thus described our invention, what we claimed as new and desire to secure by Letters Patent is as follows;

1. An electro-rheological fluid flow control valve comprising in combination:
   a housing having an inlet and an outlet and a fluid passageway between said inlet and said outlet through which fluid passageway an electro-rheological fluid flows between said inlet where said electro-rheological fluid enters said housing and said outlet where said electro-rheological fluid exits said housing;
   a narrow gap in said fluid passageway formed by a pair of oppositely disposed conductive surfaces through which gap said electro-rheological fluid flows;
   means to establish a voltage gradient across said gap to control the flow of said electro-rheological fluid through said gap; and
   means in said housing movable between a first position in which said fluid passageway is blocked and a second position in which said fluid passageway is unblocked, wherein said means provides a fail-safe shut-off of the flow of said electro-rheological fluid when said voltage gradient is interrupted.

2. An electro-rheological fluid flow control valve as in claim 1, wherein said means in said housing movable between a first position in which said fluid passageway is blocked and a second position in which said fluid passageway is unblocked is a movable plug, said pair of oppositely disposed conductive surfaces comprise a first conducting surface on said plug and a second conducting surface on an inner wall of said housing, and said gap is formed between said conducting surface on said plug and said conducting surface on said wall.

3. An electro-rheological fluid flow control valve as in claim 2, wherein said plug and said wall are tapered.

4. An electro-rheological fluid flow control valve as in claim 1, wherein said means in said housing movable between a first position in which said fluid passageway is blocked and a second position in which said fluid passageway is unblocked is a ball and said gap is formed between conducting surfaces disposed in a passageway extending through said ball.

* * * * *